Oct. 23, 1928. Re. 17,106

C. B. COLLINS

SPRING MOTOR

Original Filed Feb. 24, 1920 2 Sheets-Sheet 1

INVENTOR
Cap B. Collins
BY Philip S. McLean
ATTORNEY

Oct. 23, 1928.

Re. 17,106

C. B. COLLINS

SPRING MOTOR

Original Filed Feb. 24. 1920 2 Sheets-Sheet 2

INVENTOR
Cap B. Collins
BY
Philip S. McLean.
ATTORNEY

Reissued Oct. 23, 1928.

Re. 17,106

UNITED STATES PATENT OFFICE.

CAP B. COLLINS, OF NEW YORK, N. Y.

SPRING MOTOR.

Original No. 1,480,668, dated January 15, 1924, Serial No. 360,887, filed February 24, 1920. Renewed June 18, 1923. Application for reissue filed January 15, 1926. Serial No. 81,568.

My invention concerns novel and advantageous improvements in spring motors and concerns particularly, but not restrictedly, motors of this type whose speed is maintained substantially uniform or constant by a suitable governor or controller, such, for example, as one of the centrifugal type. Such motors are adapted for convenient and satisfactory employment in many relations, for instance in the handles of power-driven razors, telephone time-limit meters, and similar appliances. When used for actuating rotary razors, for example, the motor is housed in and operatively connected to a divided or sectional shell or casing and is wound up by turning one of such elements relatively to the other.

Various features of advantage also accrue from the particular manner or mounting and co-relating the various elements of the mechanism all of which will be readily understood from a study of the features of construction and operation of a preferred embodiment of the invention which has been fully illustrated in the accompanying drawings forming a part of this specification and throughout the views of which like reference characters refer to the same parts.

Figure 2:
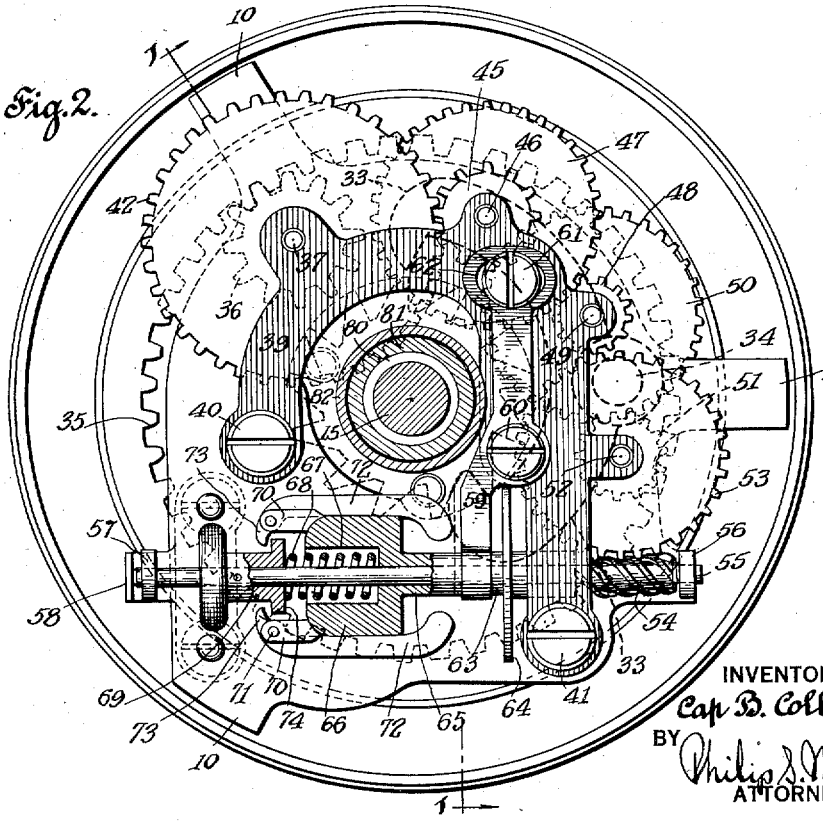
Figure 2 is a horizontal section taken on line 2—2 of Figure 1, the manually-operable stop or brake being omitted.
Figure 3:
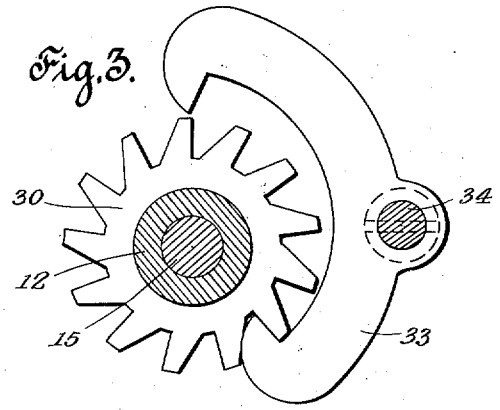
Figure 3 is a horizontal section illustrating the retaining device in plan.
Figure 4:
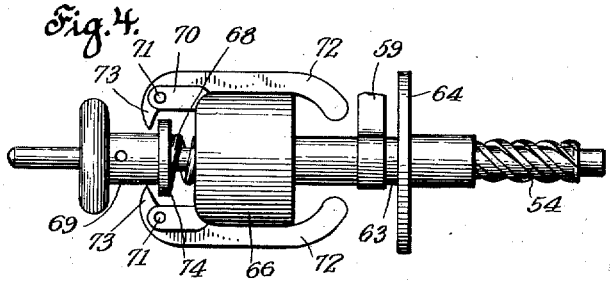
Figure 4 is a plan view of the centrifugal governor.
Figure 5:
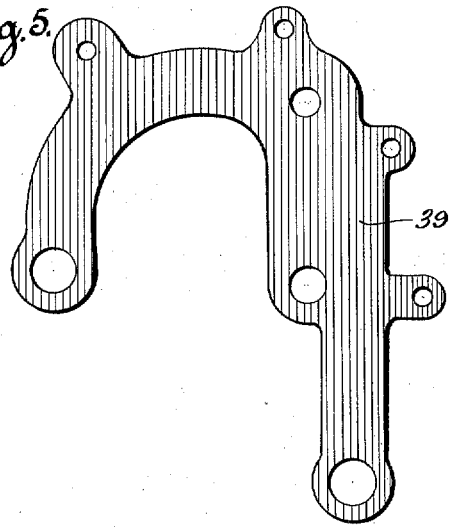
Figure 5 is a plan of the top frame member.

Referring to the drawings, it will be observed that the appliance includes a support-plate 10 of irregular shape connected at one or more of its three outstanding ears, as shown in Figure 2, to the inside of the one or upper element 11 of an enclosing casing or housing. Mounted on such plate by a screw 14 is a sleeve 12 provided with a circular flange 13 lying on the top of plate 10 and into a threaded aperture of which the retaining screw 14 fits. Inside of sleeve 12 I provide a central, stationary post 15, the two parts 12 and 15 being fixedly secured together in any approved manner as by a transverse tapered pin 16.

Figure 1:
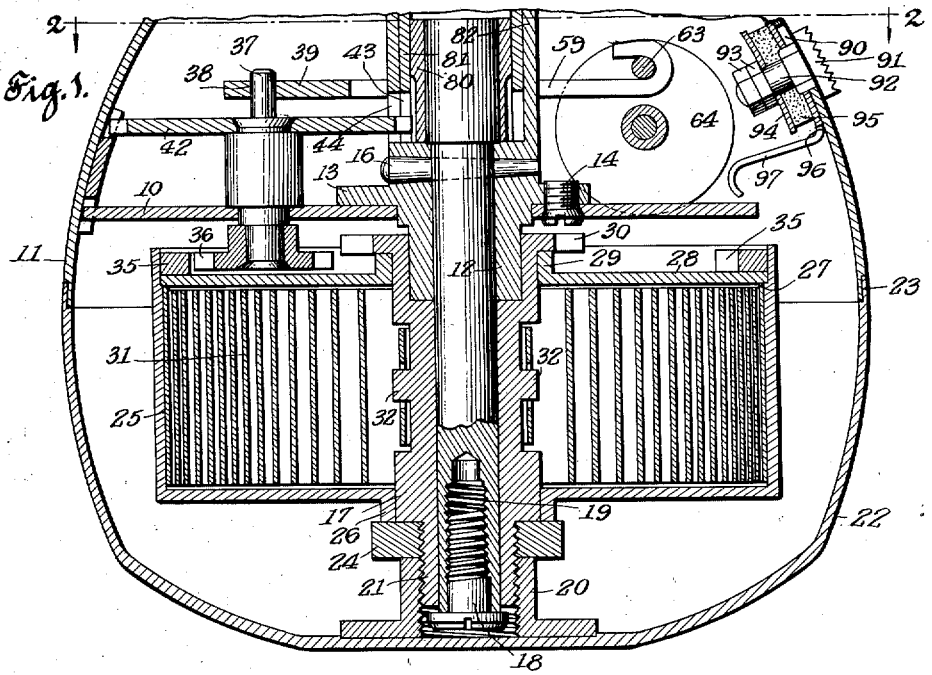
Figure 1 is a fragmentary, central, vertical section through the motor and its casing or housing on line 1—1 of Figure 2.

Revoluble on the stationary post 15 below the sleeve 12 I use a sleeve 17 which is held in position lengthwise on the post by the enlarged head of a screw 18 taking into a threaded hole 19 in the end of the post. Such sleeve 17 is turned to wind up the spring-motor as hereinafter indicated by means of an internally-threaded collar 20 screwed on a reduced, threaded, end portion 21 of the sleeve, the circular or outstanding flange of such collar being secured as by soldering or otherwise to the inner face of the other or companion registered shell or casing member 22, the opposed housing elements 11 and 22 having a circular overlapping joint 23 at their edges. A nut 24 is screwed on to the part 21 of the sleeve 17 between a shoulder of the latter and the threaded collar 20, such nut holding in position a spring drum or barrel 25 having at one end a part 26 bearing on the nut 24 and revoluble on the cylindrical portion of the sleeve. As is clearly illustrated in Figure 1 the barrel 25 has an internal circular shoulder 27 supporting a top disc 28 provided centrally with a round or annular flange 29 revoluble on the sleeve 17 and bearing at its end against the side or under face of a ratchet-wheel 30 integral with the upper portion of such sleeve. It will be appreciated from an understanding of this construction that the nut 24 holds or maintains the elements 25 and 28 in proper assembled relation between itself and the enlargement 30 of the sleeve on which such drum is revoluble.

This barrel or casing 25, 28 accommodates a flat coil-spring 31 within it, the inner portion of such spring being secured to the sleeve 17 at the points 32, 32, the outer end of the spring being fastened to the element 25 in any approved manner, not shown.

Cooperating with the teeth of the ratchet-wheel 30 I employ a suitably-shaped double-tooth pawl 33 pivoted at 34 on the under side of the main supporting-plate 10.

The inner face of the cylindrical portion of member 25 extended beyond the member 28 is provided with an internal-gear 35 the teeth of which are in mesh with those of a small gear 36 on a shaft 37 revoluble in a suitable bearing in the plate 10 and an aligned bearing 38 in an upper supporting-plate 39 carried on a plurality of posts 40, 41 rising from the underlying plate 10. Shaft 37 is equipped with a relatively-large gear 42 in mesh with the teeth of a gear 43, the teeth of which are cut in a duplex sleeve composed of two interfitted parts 80 and 81 secured together and accommodated between a portion of the post 15 and a hollow cylindrical part 82 of the fixed sleeve 12, a part of such element 82 being cut away at one side at 44 whereby the gear 42 may extend through such opening and be in cooperative relation with the teeth of the small gear 43. The portion 82 of the compound sleeve driven by the spring-motor by means of the mechanism designated may be employed to rotate any mechanism desired, such, for instance, as the rotary-blade of a razor, but, of course, the particular means operated by such gear is of little importance so far as this invention is concerned.

To render the speed of rotation of the gears 42 and 43 uniform and substantially-unvarying, it is necessary to provide the mechanism with a suitable governor or controller and this comprises the following cooperating instrumentalities. Gear 42 is in mesh and drives a smaller gear 45 on a shaft 46 revoluble in bearings in the spaced supporting plates 10 and 39, and a gear 47 on such shaft revolves a smaller gear 48 on a shaft 49 in similar manner revoluble in bearings of the same two plates, such shaft being equipped with a gear 50 the teeth of which cooperate with those of a smaller gear 51 on a shaft 52 rotatable in bearings of the two plates, this shaft having thereon a spiral gear 53, the teeth of which are in co-active relation with an elongated spiral-gear 54 on a shaft 55 rotatable in bearings in ears or lugs 56 and 57 bent up from the plate 10, an end-thrust bearing 58 being provided adjacent to the ear 57 against which the end of shaft 55 bears.

The speed of rotation of the gearing and consequently the control of the unwinding of the motor-spring 31 is effected by means of a brake-mechanism which applies a restraining influence when the speed becomes too high and removes or decreases it when the speed is too low, thus rendering the rotation of the various shafts and gears substantially uniform.

To this end a relatively stationary arm 59 is adjustable around its fulcrum or pivot pin 60 screwed into a threaded hole of the upper plate 39, such lever 59 being secured in adjusted position by means of a screw 61 taking into a threaded hole of the plate 39 and extended through a slot 62 of the arm 59. At the free end of the latter above the shaft 55 it is equipped with a fiber or other friction block 63 adapted to bear against the side face of a friction brake disc 64 forming a part of a sleeve 65 slidably mounted on the shaft 55 and having a cavity 67 in an enlarged portion 66 accommodating a coil expansion-spring 68 bearing at one end against a collar 69 fixed to the shaft 55 in any approved manner, as by pinning. The enlarged portion 66 of the slidable sleeve has two sets of spaced projections or lugs 70 between which weight arms 72, 72 are fulcrumed or pivoted at 71, 71 each of such arms having a tail portion 73 adjacent to a circular flange 74 on the sleeve 69.

In order that the motor may be readily started and stopped, the housing or casing element 11 is slotted at 90 for the accommodation of a sliding finger-piece 91 roughened externally and frictionally held in position by means of a stud 92 secured thereto and extending inwardly through the opening 90, the threaded portion of the stem being equipped with a pair of nuts 93, 93 bearing on a washer 94 between which and the inner face of the shell or casing element is a washer of leather 95 or other suitable compressible material and a flat leaf-spring member 96 apertured for the accommodation of the stud and bent to provide an extension 97 adapted to be shifted into and out of engagement with the periphery of the friction or brake disk 64.

The operation of the appliance will be readily understood from the detailed description of the construction and its various parts but may be summarized as follows:

To wind up the motor, the operator holds the casing element 11 in one hand and turns the other 22 relatively thereto, the rotation of the latter effecting the turning of the sleeve 17 and the winding of the spring by reason of the connections between them at 32, unwinding of the spring 31 being prevented by reason of the co-action of the pawl 33 with the ratchet-wheel 30 carried by such sleeve. As soon as the brake spring 97 is shifted away from the friction-disc 64 by sliding the finger-piece 91 in the proper direction in the slot 90 of the casing or housing element 11, the spring 31 will begin to unwind from its outer end, its inner end being held against rotation, and will revolve the barrel 25, 28 and its internal-gear 35, the rotation of which is transmitted through gear 36, shaft 37, and gears 42, 43 to the hollow shaft or sleeve element 80, 81, from which the power may be taken off to drive any mechanism desired.

The speed of rotation of these parts is, of course, controlled and regulated by the action of the centrifugally-operated weight-arms 72, 72 which will be thrown out more or less depending upon the speed of rotation of shaft 55. If the speed becomes excessive, the feet 73 will engage the fixed flange 74 by reason of the outward movement of the arms 72 and pull the sleeve 65 to the left, as the parts are viewed in Figure 2, thus increasing the braking-pressure of the friction-disc 64 on the fiber or other element 63. As soon as the speed decreases below normal this pressure also diminishes because of the slight movement of the sleeve to the right, as is permitted through the movements of the portions 73 of the arms 72 relative to the flange 74. The train of gears which drives the shaft 55 from the gear 42 constitutes merely a speed increasing mechanism of the usual type so as to make available a rate of rotation suitable and proper for the operation of a centrifugal-governor.

The upper section 11 may be considered as the main section of the casing since it forms the base or support for the motor mechanism and the lower section 22 may be considered as an end cap forming a continuation of the main section and a closure for the open end of the same. The nut 20 which engages the lower threaded end of the tubular sleeve or winding stem 17 is affixed centrally to the end wall of the lower cover section so that this section rotates concentrically and this form of connection enables quick detachment of the end casing section if that be necessary or desirable. The removal of the end cover section exposes a large part of the spring motor, projecting as it does from the open end of the main casing section and the sleeve or hollow winding stem 17 projects from the motor sufficiently to enable the cap section being readily engaged therewith. The governor and the brake both operate on the same shaft 55 so that all control is exercised at one part of the mechanism and as this is a high speed shaft this control is of a smooth character, without strain on any of the gearing or connections. The plate 28 closing the upper end of the spring barrel and the ring gear 35 overstanding the same are seated in the end of the barrel in definite location by means of the internal shoulder 27 in the barrel.

The invention is not limited or restricted to the precise and exact features of construction set forth in detail above and illustrated fully in the drawings, because these may be modified within comparatively wide limits without departure from the heart and essence of the invention and without the sacrifice of any of its substantial benefits and advantages.

What is claimed is:

1. In an appliance of the character described, the combination of a casing composed of registering sections formed to overlap one another at their meeting edges and capable of rotation relatively to one another, a spring-motor carried by one of said sections, a shaft rotated by the unwinding of the spring of said motor, governing means to render the speed of rotation of said shaft substantially constant, and means to effect winding of the motor upon relative rotation of said sections, substantially as described.

2. In an appliance of the character described, the combination of a post, a sleeve revoluble on said post, a coil-spring having its inner end connected to said sleeve, means to turn said sleeve on the post to wind up the spring, means to prevent backward rotation of the sleeve on the post, a spring-barrel connected to the outer end of the spring and revoluble on said sleeve and rotated by the unwinding of the spring, a second sleeve on said post, and gearing connecting said barrel and second sleeve whereby the former rotates the latter including an internal-gear mounted on said spring-barrel, substantially as described.

3. In an appliance of the character described, the combination of a casing composed of registering sections capable of rotation relatively to one another, a post carried by one of said sections, a sleeve revoluble on said post and connected to the other casing section, a coil-spring in said sectional casing having its inner end connected to said sleeve, means to prevent backward rotation of the sleeve on the post, gearing operated by the outer end of the spring and rotated by the unwinding of the spring, a governor controlling the unwinding of the spring, and a second sleeve on said post revolved by said gearing, substantially as described.

4. In an appliance of the character described, the combination of a casing composed of registering sections capable of rotation relatively to one another, a post carried by one of said sections, a sleeve revoluble on said post and connected to the other casing section, a coil-spring having its inner end connected to said sleeve, a ratchet-wheel rotated by said sleeve, a pawl cooperating with said ratchet-wheel to prevent backward rotation of the sleeve on the post, a spring-barrel connected to the outer end of the spring and revoluble on said sleeve, a second sleeve on said post, and gearing connecting said spring-barrel and second sleeve whereby the motor revolves the latter, the spring being wound up by the turning of one of said casing sections relatively to the other, substantially as described.

5. In an appliance of the character described, the combination of a relatively-fixed post, an apertured sleeve fixed to and surrounding said post, a second revoluble driven sleeve between said post and sleeve having gear-teeth thereon, a third sleeve revoluble on said post, a coil-spring having its inner end connected to said third sleeve, means to rotate said third sleeve to wind up the spring, gearing connected to the outer end of said spring and projecting through the aperture of said first sleeve and in mesh with the gear of said second sleeve, and a governor controlling the speed of rotation of said driven sleeve, substantially as described.

6. In an appliance of the character described, the combination of a casing composed of registering sections capable of rotation relatively to one another, a post mounted on one of said sections, an apertured sleeve fixed to and surrounding said post, a second revoluble driven sleeve between said post and sleeve having gear teeth thereon, a third sleeve revoluble on said post and operatively connected to the other casing section, a coil-spring having its inner end connected to said third sleeve, gearing connected to the outer end of said spring and projecting through the aperture of said first sleeve and in mesh with the gear of said second driven sleeve, and a governor controlling the speed of rotation of said driven sleeve, substantially as described.

7. In apparatus of the character described, a casing composed of cooperating relatively rotatable sections, a spring motor carried by one of said sections and provided with a winding member exposed to the other relatively rotatable section, a shaft rotated by the unwinding of the spring of said motor, governing means to render the speed of rotation of said shaft substantially constant and a screw connection between the second casing section and the exposed winding member of the spring motor, whereby said second section may be readily mounted and unmounted with respect to the first section, the spring of the motor being wound in the direction of the tightening of said screw connection so that a continuation of the screwing on movement of said section will effect the winding of the motor.

8. In apparatus of the character described, a casing composed of cooperating relatively rotatable sections, one forming an extension of and an end closure for the other, a screw member inside the end wall of said end closure section and carried thereby, a spring motor mounted in the other casing section and having a screw member at the end of said casing section and detachably engageable by the screw member of the end casing section and a shaft journaled in the spring motor section of the casing and operated by the unwinding of the spring of said motor.

9. In apparatus of the character disclosed, a casing composed of cooperating relatively rotatable sections, one forming an end closure for the other, the end closure section having a screw socket inside the same at the center thereof, a spring motor mounted in the other section having a screwthreaded winding stem engaged in the screw socket of the end section so that upon relative rotation of the two casing sections, the spring of the motor will be wound and a shaft in the spring motor section operated by the unwinding of the spring.

10. In apparatus of the character disclosed, a casing composed of cooperating relatively rotatable sections, one forming an end closure to the other, a centrally arranged screw member carried by said end section, a spring motor mounted in the other section and having a winding member provided with a screw element engaged by the screw member of the end section, a shaft operated by the unwinding of the spring of the motor and a governor for maintaining the speed of said shaft substantially constant.

11. In apparatus of the character described, a casing composed of cooperating relatively rotatable sections, a spring motor mounted in one section and including a spring barrel projecting from said section and having a projecting centrally arranged winding stem, the cooperating casing section enclosing the projecting barrel of the spring motor and provided with a centrally disposed screw socket detachably engaging the screwthreaded winding stem of the motor, a shaft in the first section operated by the unwinding of the motor and means in the first section regulating the speed of said shaft.

12. In apparatus of the character described, a casing composed of cooperating relatively rotatable sections, a post carried by one section and projecting into the other relatively rotatable section, a spring barrel rotatably mounted on said post and carrying a power spring, a shaft operated by the unwinding movement of the spring barrel on the post and means for effecting the winding of the spring by relative rotary movement of the casing sections.

13. In apparatus of the character described, a casing composed of cooperating relatively rotatable sections arranged in overlapping relation and one forming an extension of an end closure for the other, a centrally arranged screw member carried by said end closure section, a spring motor carried by the other section having a projecting winding member provided with a screw element engageable with the screw member of the end section and a shaft in the spring motor section operated by the unwinding of the spring.

14. In apparatus of the character disclosed, a casing composed of cooperating relatively rotatable sections, a post carried by one section, a sleeve on said post, means for securing said sleeve in position on the post, a spring barrel journaled on the sleeve, a power spring in said barrel secured at its inner end to the sleeve, a shaft driven from the spring barrel and means for effecting a spring winding movement of the sleeve by relative rotation of the casing sections.

15. In apparatus of the character described, a casing composed of relatively rotatable cooperating sections, one forming an end closure to the other, a screw socket having a wide flange by which the same is secured inside the end wall of the end section, a spring motor mounted in the other casing section, having a screwthreaded winding stem engaged in the screw socket and whereby the two sections are rotatably coupled and a shaft in the spring motor section operated by the unwinding of the spring of the motor.

16. In apparatus of the character described, a frame, a rotatable support mounted on said frame, said support carrying a ratchet at one end and having a screwthreaded stem at the opposite end, a spring barrel journaled on said support, a spring in said barrel anchored at its inner end to the rotatable support, a shaft operated by the unwinding movement of the spring barrel and a windthe open end of said first section, a post supported in said first section and projecting into the cap section, a spring barrel mounted on the projecting portion of said post, a sleeve mounted on the post, a spring in the barrel anchored at its inner end to said sleeve, driving means carried by the cap section for winding the spring upon relative rotation of the two casing sections, pawl and ratchet mechanism for holding the inner end of the spring against unwinding movement, gearing driven from the spring barrel, a shaft journaled in the first section and operated by said gearing and a governor in the first casing section for maintaining the speed of said shaft substantially constant.

28. In apparatus of the character described, a casing of substantially circular cross section and composed of a main section having an open end and a relatively rotatable cap section covering said open end of the main section, an axially arranged longitudinally extending supporting post in the main section, a spring motor mounted on said post, means for winding said spring motor by rotation of the cap section with respect to the main casing section, a shaft mounted in the main section in concentric relation to said post and operated by the unwinding of the spring of the motor and means for governing the operation of said shaft.

29. In apparatus of the character disclosed, a spring-motor and mechanism operated thereby, a housing for said spring-motor, including coextensive, substantially equal diameter relatively rotatable overlapping casing sections, said motor being supported in one of said casing sections and having a winding connection with the other casing section whereby upon relative rotative movement of the casing sections said spring-motor will be wound to drive the mechanism aforesaid.

30. In apparatus of the character disclosed, a spring-motor including a power spring and a centrally arranged supporting shaft for winding the same, said spring supporting and winding shaft having a screw threaded outer end portion exposed at the end of the motor, pawl and ratchet mechanism for holding the inner end of said winding shaft, a casing enclosing the spring-motor and a relatively rotatable hand grip substantially coextensive with the casing and having a screw connection with and mounting on said outer end of the winding shaft.

In testimony whereof, I affix my signature.

CAP B. COLLINS.

ing casing member enclosing the spring barrel and having a screw connection with the screwthreaded stem of the rotatable support.

17. In apparatus of the character described, a frame, a rotatable support mounted on said frame, said support carrying a ratchet at one end and having a screwthreaded stem at the opposite end, a spring barrel journaled on said support, a spring in said barrel anchored at its inner end to the rotatable support, a shaft operated by the unwinding movement of the spring barrel and a winding member having a screw connection with the screwthreaded stem of the rotatable support and including a hollow handle forming a readily detachable end cover over the spring barrel.

18. In apparatus of the character disclosed, a spring barrel having an open end and provided with an internal shoulder in such open end, a spring seated in said barrel, a closure plate seated in the open end of the barrel in engagement with said shoulder and a ring gear seated in the open end of the barrel over said closure plate.

19. In apparatus of the character disclosed, a spring barrel having an open end and provided with an internal shoulder in said open end, a spring within the barrel and a ring gear and a closure plate seated in the open end of the barrel over the internal shoulder therein.

20. In apparatus of the character disclosed, a supporting sleeve, a spring barrel having one end journaled on said sleeve and open at its opposite end, said open end of the barrel having an internal shoulder, a spring within the barrel anchored at its inner end to the sleeve, a ring gear and a closure plate engaged in the open end of the barrel over the internal shoulder, said closure plate having a rotatable bearing on the sleeve, means for rotating the sleeve to wind the spring and a pinion engaged with the ring gear for taking off the power of the unwinding movement of the spring.

21. In an appliance of the character described, the combination of a post, a sleeve on said post, a coil spring having its inner end connected to said sleeve, means to turn said sleeve to wind up the spring, means to prevent backward rotation of the sleeve, a spring barrel connected to the outer end of the spring and revolûble on said sleeve and rotated by the unwinding of the spring, a rotatable shaft and gearing connecting said barrel and shaft, whereby the former rotates the latter including an internal gear mounted on said spring barrel.

22. In apparatus of the character described, a sectional casing, a stationary post supported in one section of the casing, a spring motor having a spring barrel rotatably supported on said post, a power spring in said barrel and winding means for said spring connected with the other section of the casing and providing a rotatable support for said other casing section.

23. In apparatus of the character described, a casing composed of relatively rotatable sections, one forming an end closure for the other, a sleeve connected with the end closure section, a post carried by the other section and on which said sleeve is rotatably engaged, a spring barrel rotatable about said sleeve, a spring in said barrel connected at its inner end with the sleeve, a shaft journaled in concentric relation to the post and gearing for operating said shaft from the spring barrel.

24. In apparatus of the character described, a casing composed of relatively rotatable sections, one forming an end closure for the other, a sleeve connected with the end closure section, a post carried by the other section and on which said sleeve is rotatably engaged, a spring barrel rotatable about said sleeve, a spring in said barrel connected at its inner end with the sleeve, a shaft journaled in concentric relation to the post, gearing for operating said shaft from the spring barrel and a governor within the casing section which supports the post for maintaining the speed of rotation of the shaft substantially constant.

25. In apparatus of the character disclosed, a sectional casing composed of a main open ended section and a relatively rotatable end cap closing the open end of said main section, a supporting post centrally mounted in the main section, a spring motor including a spring barrel mounted on the post and a spring winding member exposed at the open end of the main section, a spring winding connection between said member and the end cap section of the casing, a shaft journaled in the main section of the casing and operated by said spring motor and means for controlling the operation of said shaft.

26. In apparatus of the character disclosed, a sectional casing composed of a main open ended section and a relatively rotatable end cap closing the open end of said main section, a supporting post centrally mounted in the main section, a spring motor including a spring barrel mounted on the post and a spring winding member exposed at the open end of the main section, a spring winding connection between said member and the end cap section of the casing, a shaft journaled in the main section of the casing and operated by said spring motor, means for controlling the operation of said shaft and pawl and ratchet holding means for the spring motor located within the main section of the casing.

27. In apparatus of the character disclosed, a casing composed of an open ended section and a relatively rotatable cap section closing